(12) United States Patent
Barham et al.

(10) Patent No.: US 7,539,239 B2
(45) Date of Patent: May 26, 2009

(54) APPARATUS FOR RAPID PN CODE ACQUISITION

(75) Inventors: Steven T. Barham, Taylorsville, UT (US); Samuel Kingston, Salt Lake City, UT (US); Randal R. Sylvester, West Valley, UT (US); Ronald Leahy, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 344 days.

(21) Appl. No.: 11/533,509

(22) Filed: Sep. 20, 2006

(65) Prior Publication Data

US 2007/0014336 A1    Jan. 18, 2007

Related U.S. Application Data

(63) Continuation of application No. 09/620,888, filed on Jul. 21, 2000, now Pat. No. 7,126,982.

(51) Int. Cl.
*H04B 1/69* (2006.01)
*H04B 1/707* (2006.01)
*H04B 1/713* (2006.01)

(52) U.S. Cl. .................. 375/150; 375/142; 375/149; 375/145

(58) Field of Classification Search ................. 375/150, 375/142, 149, 145, 143, 141, 152, 357, 130; 370/335; 455/67.14
See application file for complete search history.

(56) References Cited

U.S. PATENT DOCUMENTS

| | | | |
|---|---|---|---|
| 5,199,050 A | | 3/1993 | Linsky et al. |
| 5,341,396 A | * | 8/1994 | Higgins et al. ............... 375/130 |
| 5,483,676 A | * | 1/1996 | Mahany et al. ........... 455/67.14 |
| 5,574,721 A | | 11/1996 | Magill |
| 5,703,873 A | | 12/1997 | Ojanpera et al. |
| 5,712,869 A | | 1/1998 | Lee et al. |
| 5,946,344 A | | 8/1999 | Warren et al. |
| 5,969,894 A | | 10/1999 | Howell et al. |
| 5,974,106 A | * | 10/1999 | Dupont et al. ............... 375/377 |
| 6,233,231 B1 | | 5/2001 | Felix et al. |
| 6,542,471 B1 | | 4/2003 | Ito |
| 6,700,881 B1 | * | 3/2004 | Kong et al. .................. 370/335 |
| 6,738,412 B1 | | 5/2004 | Hayakawa |

\* cited by examiner

*Primary Examiner*—Phuong Phu
(74) *Attorney, Agent, or Firm*—Perman & Green, LLP

(57) ABSTRACT

An apparatus and method of determining a signal code. The method comprising steps of acquiring and correlating a signal with a first code sequence. In response to the timing lock is achieved. Also in response to the signal correlation, an acknowledge from a receiver of the signal to a transmitter change to a second code sequence.

7 Claims, 5 Drawing Sheets

APPARATUS FOR RAPID PN CODE ACQUISITION

CROSS-REFERENCE TO RELATED APPLICATION(S)

This application is a continuation of and claims the benefit of U.S. application Ser. No. 09/620,888, filed 21 Jul. 2000 now U.S. Pat. No.7,126,982, which is incorporated by reference herein in its entirety, status allowed.

BACKGROUND OF THE INVENTION

1. Field of the Invention

The present invention relates to communications and, more particularly, to code division multiple access techniques.

2. Prior Art

Referring now to FIG. 2 there is shown a block diagram of a direct sequence coded spread spectrum system. As shown in the diagram a carrier signal generated by carrier generator 80 is modulated at mixer 98 by data 82. The data modulation operates at a rate determined by code clock divided by spreading gain G 84. The modulated signal is further mixed 99 with a code generated by the pseudo-noise (PN) code generator 86 operating at a clock rate determined by code clock 85. The transmitter 88 transmits the twice modulated signal via antenna 90. The transmitted signal is received by receiver 94 via antenna 92. The received signal is correlated with a PN code generated by PN code generator 106 at mixer 96. A signal passing correlation is then demodulated by mixing the correlated signal with a local carrier recovery 104 in mixer 100. The transmitted data and clock rate are recovered in data processing 102 and 108, respectively. The recovered data 110 is passed to the remainder of the system for further processing while the recovered clock is used to drive the PN code generator 106 and the data processing 102 after being reduced divided by the message rate Rb. The time duration of Rc is $1/Rc=Tc$ and is referred to as a chip. In general, when changing from a low-rate PN code to a higher rate PN code, where $Tc_{low}$ and $Tc_{high}$, are the chip times, respectively, the spreading gain is multiplied by the ratio $Tc_{low}/Tc_{high}$. The average time that is required to complete a search for PN timing is k/Rb per chip of uncertainty, where k is some constant of proportionality based on the search technique. Hence, if we do the initial search using a shorter low-rate PN and then synchronously switch to a higher-rate PN the average search time can be reduced by as much as $Tc_{low}/Tc_{high}$.

SUMMARY OF THE INVENTION

In accordance with one method of the present invention, a method for determining a signal code. The method comprising steps of acquiring and correlating a signal with a first code sequence and achieving a timing lock in response to the step of correlating the signal with a first code sequence. Also in response to the correlated signal the receiver transmits an acknowledgement signal to a transmitter of the signal where upon the receiver and transmitter change from the first code sequence to a second code sequence.

In accordance with one embodiment of the present invention a signal code acquisition system comprising a first transceiver and a first multi-rate code generator connected to the first transceiver; a second transceiver responsive to the first transceiver; and a second multi-rate code generator connected to the second transceiver.

In accordance with another method of the present invention a method of determining a coded signal, the method comprising steps of: transmitting a first coded signal from a transmitter system; receiving the first coded signal on a receiver system; calculating a probability of detection of the first coded signal; and changing the first coded signal to a second coded signal responsive to the probability of detection (PD) of the first coded signal.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
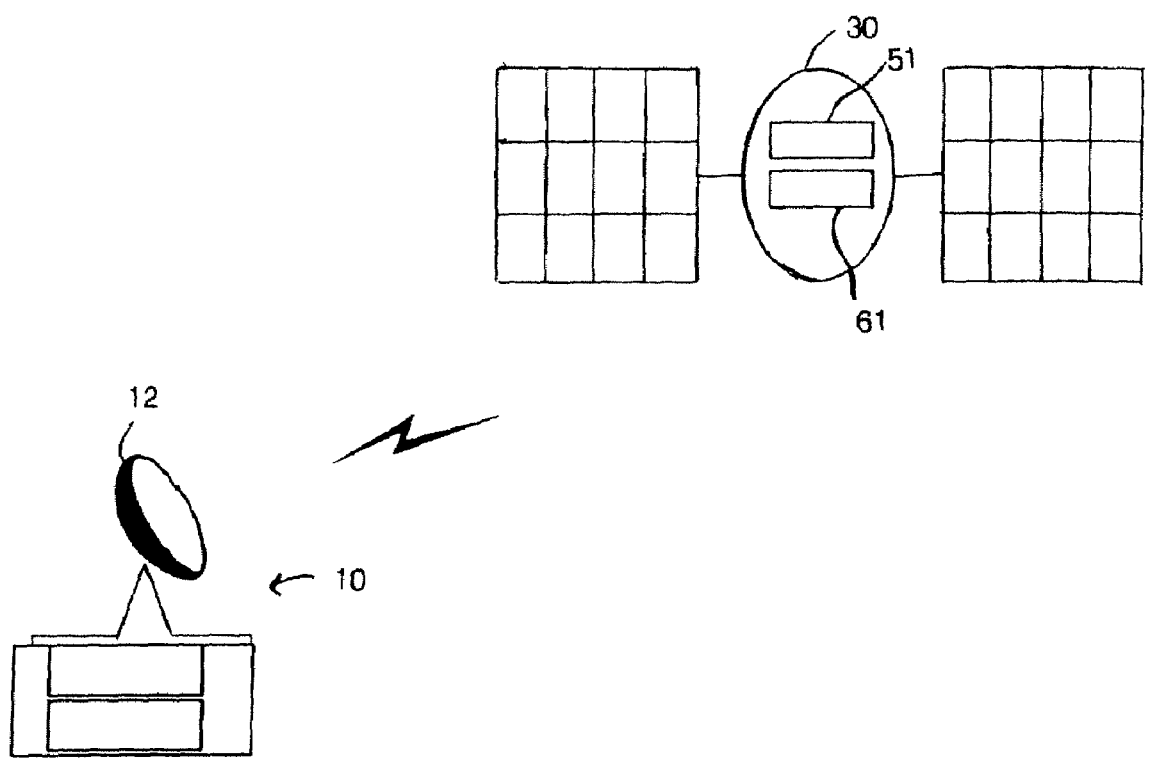
FIG. 1 is a perspective view of a satellite communications system and a base station communications system to which the satellite communications system is bidirectionally coupled through a wireless RF link and incorporates features of this invention.
Figure 2:
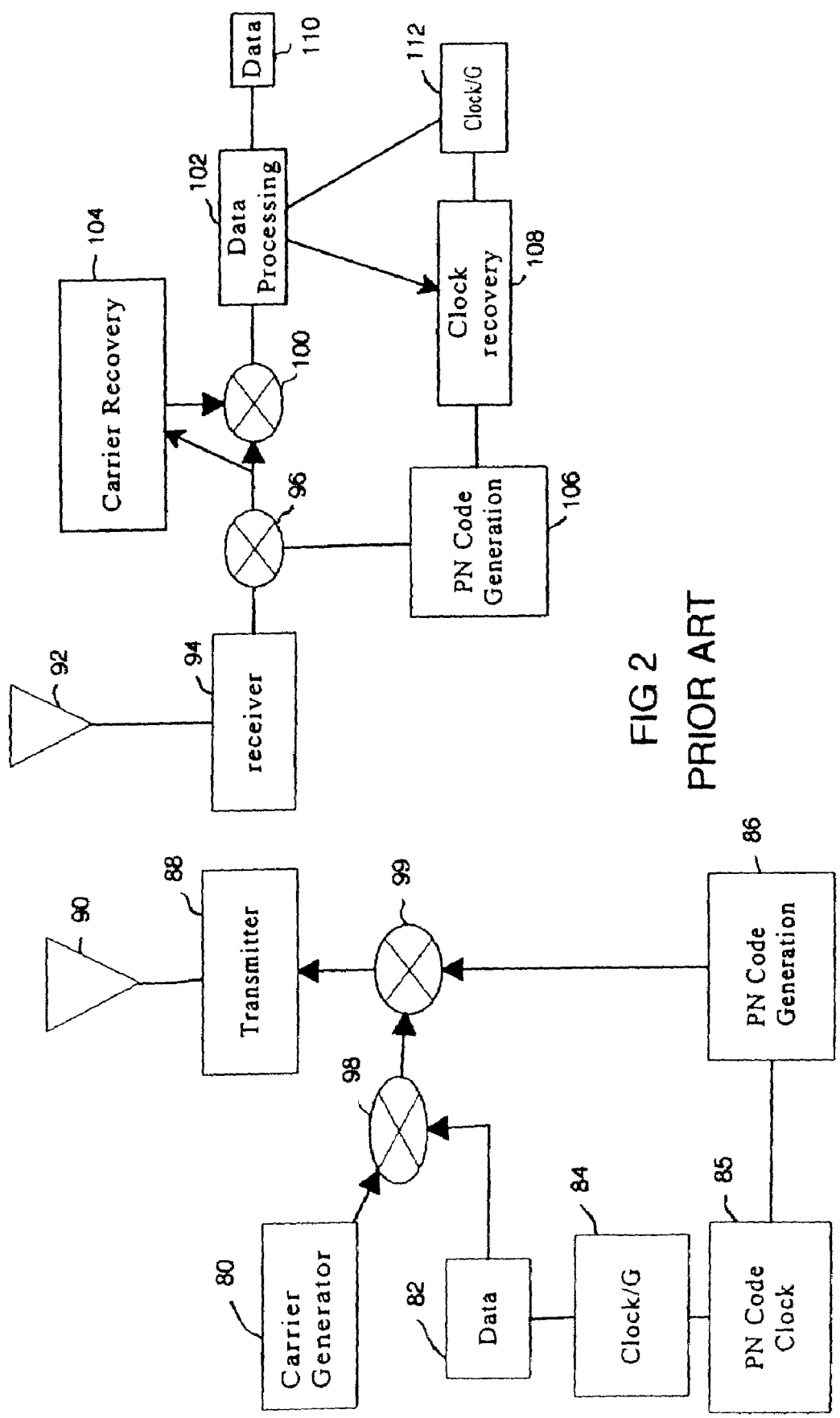
FIG. 2 is a block diagram of a direct sequence PN coded system.

Although the present invention will be described with reference to the embodiments shown in the drawings, it should be understood that the present invention can be embodied in many alternate forms of embodiments. In addition, any suitable size, shape or type of elements or materials could be used.

Reference is first made to FIG. 1 for illustrating a base station 10, such as but not limited to satellite communications base station, that is suitable for practicing this invention. The base station 10 includes an antenna 12 for transmitting signals to and for receiving signals from a base orbiting satellite 30.

Figure 3:
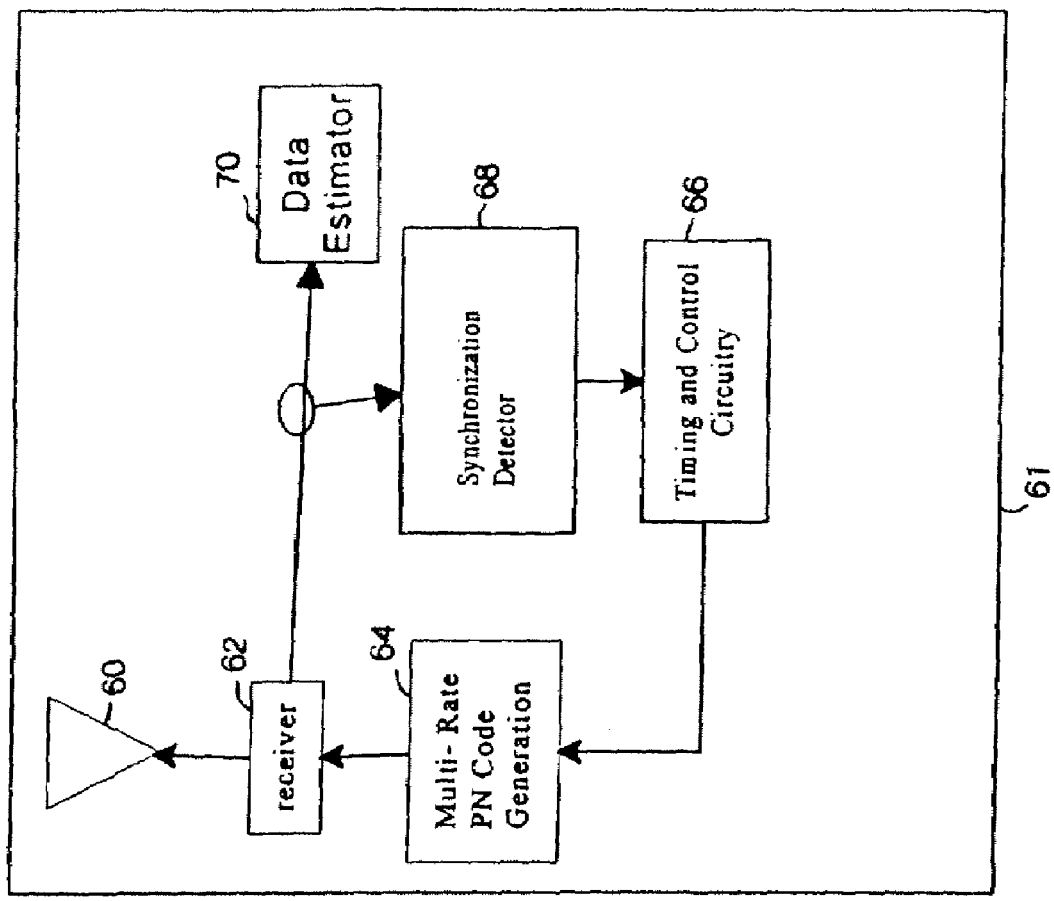
FIG. 3 is a block diagram of multi-rate PN coded system illustrating an embodiment of this invention.
Figure 3:
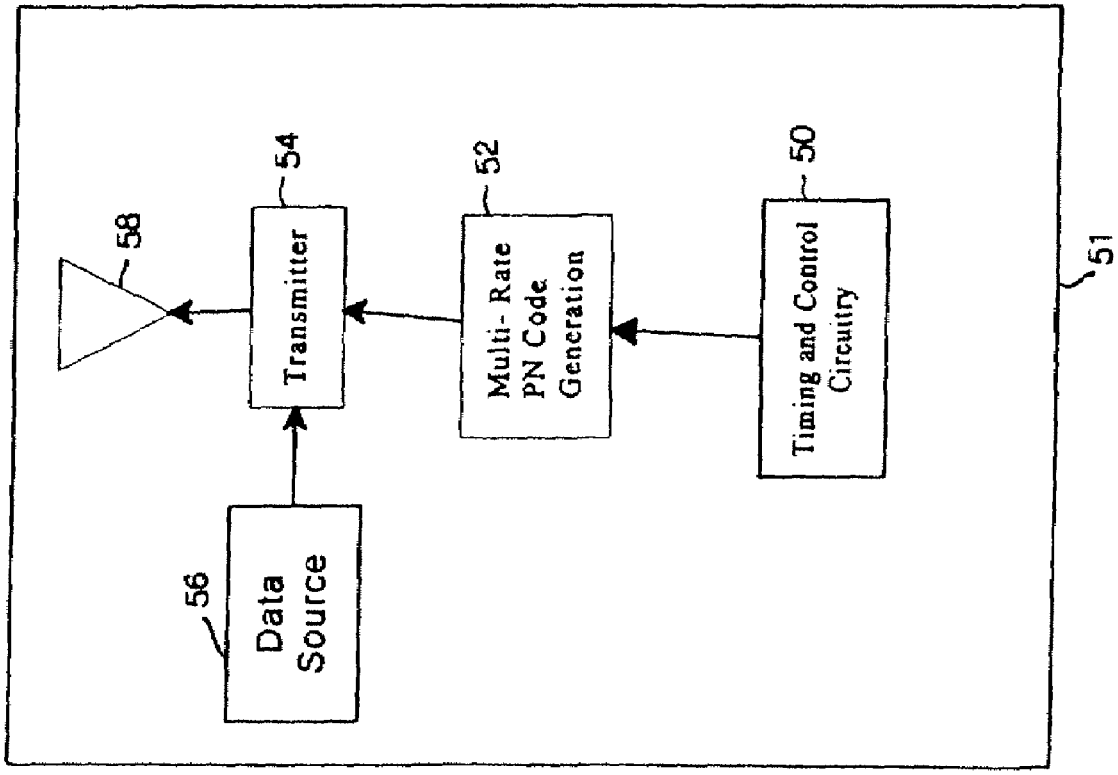

Referring now to FIGS. 1 and 3. The base station 10 and The orbiting satellite 30 include circuitry for transmitting coded signals 51 and circuitry for decoding received signals 61. The circuitry for transmitting coded signals includes a multi-rate pseudo-noise (PN) code generator 52, transmitting timing and control circuitry 50, a transmitter 54, data source 56, and an antenna 58. The circuitry for receiving the coded signal includes a receiver front end 62, a synchronization detector 68, receiving timing and control circuitry 66, a multi-rate PN code generator 64, data estimator 70, and an antenna 60 for receiving signals. The coding method for this invention is assumed to be based on CDMA such as is known from or that is similar to air standards IS-95 PCS or W-CDMA, although the teaching of this invention is not intended to be limited only to that particular type of CDMA system. The present invention, providing significant reduction in PN code acquisition time over conventional PN code acquisition time, could be used with any suitable type of radio telephone system or suitable electronic device.

Figure 4:
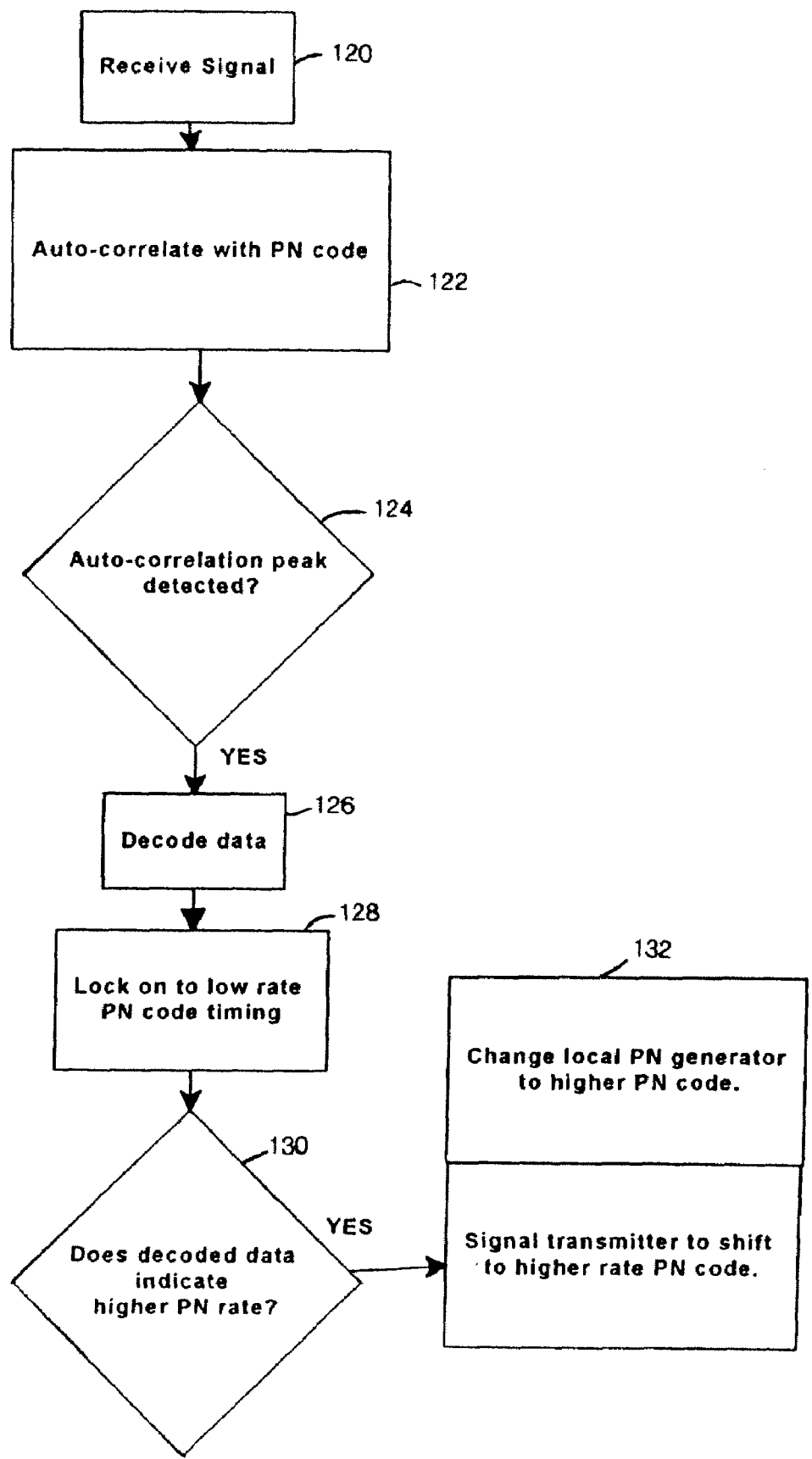
FIG. 4 is a flow chart illustrating one method of the present invention.

Referring now to FIGS. 3 and 4, there is shown a block diagram of a transmitter and receiver system and a method flow chart incorporating features of the present invention. The transmitter 54 transmits data 56 modulated by a carrier signal and further modulated by multi-rate PN code generator 52 through antenna 58. The PN code generator 52 is controlled by timing and control circuitry 50. The receiver 62 receives the twice modulated carrier signal 120 via antenna 60. The signal is auto-correlated with a PN code 122 supplied by multi-rate PN code generator 64. If the signal auto-correlation peak is found then the signal is a desired signal and is further demodulated to retrieve data 126 and recover synchronization 68. The synchronization then tracks the PN timing 128 via the timing and control circuitry 66 and signals the transmitting system and the receiving system to contemporaneously shift to a higher rate PN code 132 via their respective multi-rate PN generators 52,64. Thus, for purposes of illustration, if the lower rate PN code duration is designated as $Tc_{low}$ and the higher rate PN code duration is designated as $Tc_{high}$ the search time, or PN code acquisition time, is reduced by a factor of $Tc_{low}/TC_{high}$. For example, in the prior art the search time for a PN code duration is the processing gain times an uncertainty factor. Using the lower code duration $Tc_{10-}$, the processing gain is $Tb/Tc_{low}$, where Tb is the message bit duration. Without the current invention the processing gain when shifting to a higher rate PN code would be $TB/Tc_{high}$. Assuming that $Tc_{high}$ is some multiple 1/M of $Tc_{low}$, then the processing gain equation can be rewritten as $Tb*M/Tc_{low}$. Then, assuming an average search rate of k/Rb per chip of uncertainty, the PN search time is then $(M*Tb/Tc_{low})*k/Rb$, where Rb is the message bit rate. Thus, the average search time has been increased by a factor of M when shifting from a low rate PN code to a high rate PN code. By contrast, the current invention uses a narrow bandwidth timing recovery loop to maintain the timing lock achieved during the acquisition of the first or lower rate PN code while both multi-rate generators contemporaneously shift to the higher rate PN code. Since the timing lock is maintained the search time equation is the original gain times the uncertainty factor, which in this example is $Tb/Tc_{low}*(k/Rb)$. Thus, the average search rate has been reduced by a factor M when shifting from the lower rate PN code to the higher rate PN code.

Figure 5:
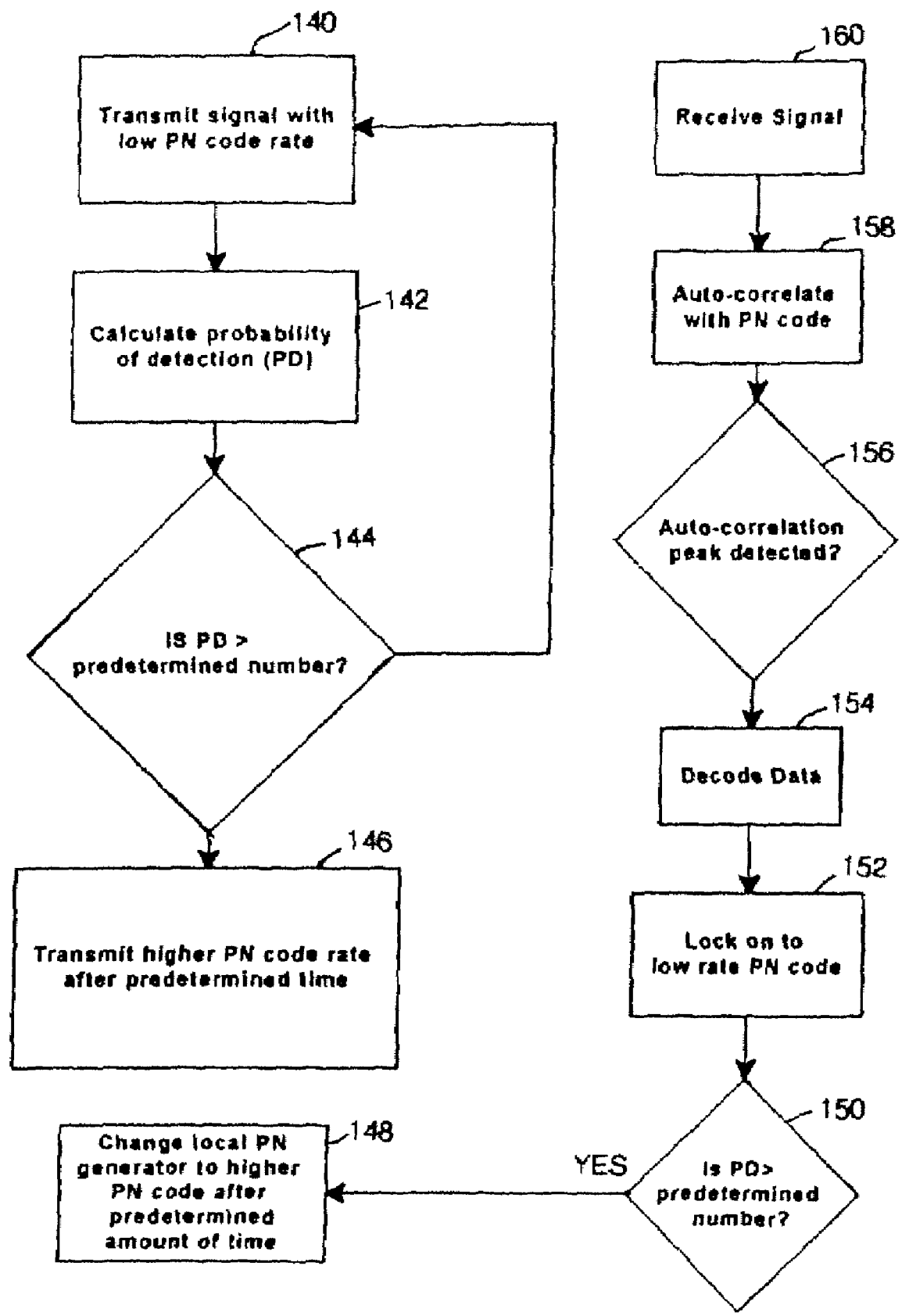
FIG. 5 is a flow chart illustrating an alternative method of the present invention.

Referring now to FIG. 5 there is shown a flow chart of a second method of the present invention. The transmitter transmits 140 a low rate PN modulated signal. The transmitter calculates a probability of detection(PD) 142 by the receiver 62. If the PD is greater than a predetermined amount 144 the transmitter will shift 146 the multi-rate PN generator 52 to a higher rate PN code after a predetermined amount of time or event. Meanwhile, the receiver 62 receives 160 the signal and auto-correlates 158 with the low rate PN code generated by the multi-rate PN generator 64. If the signal auto-correlation peak is found 156 then the data is decoded 154 and the synchronization detector 68 and the timing and control circuitry lock 152 on to the signal timing the receiver also calculates the PD and if greater than the predetermined amount will shift 150 the multi-rate PN generator 64 to the higher PN code 148 after the predetermined amount of time or event. The processing gain and search times are calculated as before.

It should be understood that the foregoing description is only illustrative of the invention. Various alternatives and modifications can be devised by those skilled in the art without departing from invention. Accordingly, the present invention is intended to embrace all alternatives, modifications and variances which fall within the scope of the appended claims.

What is claimed is:

1. A method of acquiring a signal code, the method comprising steps of:
    acquiring a signal from a first transceiver at a second transceiver;
    as part of the acquisition, correlating the signal with a first code sequence having a first code rate and achieving a timing lock at said first code rate;
    transmitting, in response to the step of correlating the signal with said first code sequence, an acknowledgement from said second transceiver of the signal to said first transceiver of the signal;
    changing, at said first and second transceivers, in response to the step of correlating the signal with the first code sequence, to a second code sequence having a second code rate that is higher than said first code rate; and
    maintaining the timing lock while said first and second multi-rate generators shift to the second code sequence.

2. A method as in claim 1 wherein the first and second code sequences comprise a pseudo-noise (PN) code sequence.

3. A method as in claim 1 wherein the step of changing to the second code sequence comprises the steps of:
    tracking the first code sequence of the signal in the second transceiver;
    changing the first code sequence of the signal of a first code generator of the first transceiver to the second code sequence; and
    changing the first code sequence of the signal of a second code generator of the second transceiver to the second code sequence.

4. A method as in claim 1 wherein the step of changing the first code sequence to the second code sequence at said first and second transceivers is in response to the occurrence of a predetermined event.

5. A signal code acquisition system comprising:
    a first transceiver;
    a first multi-rate code generator connected to the first transceiver for generating a first coded sequence having a first code rate;
    a second transceiver responsive to the first transceiver for acquiring said first coded sequence at said first code rate;
    a second multi-rate code generator connected to the second transceiver; and
    control circuits for, as part of the acquisition and correlating of the signal with the first code sequence, achieving a timing lock at said first code rate; and
    wherein said control circuits cause said first and second multi-rate code generators, at said first and second transceivers, to shift to a second code sequence having a second code rate that is higher than said first code rate, said control circuits further having means to maintain the timing lock while said first and second multi-rate generators shift to the second code sequence.

6. A signal code acquisition system as in claim 5 wherein the first and second multi-rate code generators comprise a pseudo-noise (PN) code generator.

7. A signal code acquisition system as in claim 5 wherein the first and second multi-rate code generators comprise dual rate code generators.

* * * * *